Oct. 8, 1935. E. F. NELSON 2,016,386
CONVERSION OF HYDROCARBON OILS
Filed April 24, 1933
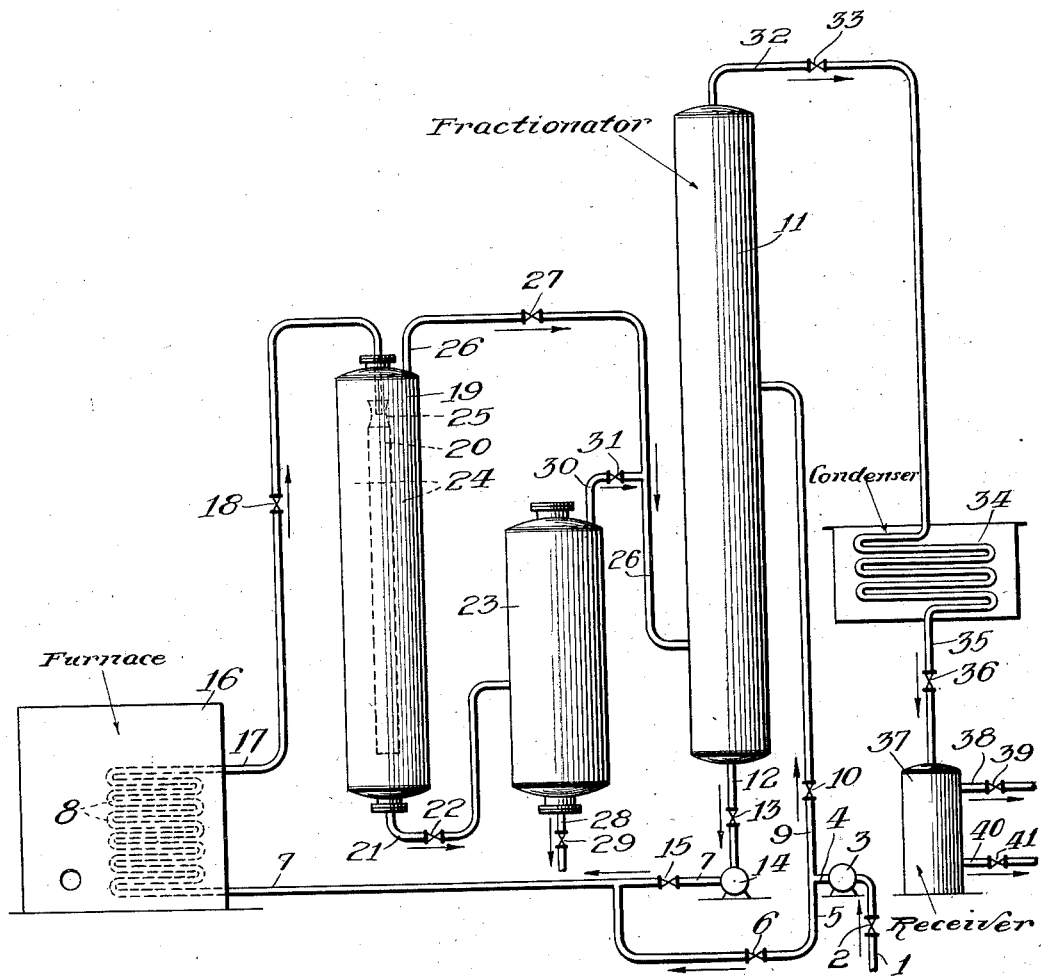
INVENTOR.
Edwin F. Nelson,
BY
ATTORNEY.

Patented Oct. 8, 1935

2,016,386

UNITED STATES PATENT OFFICE 2,016,386

CONVERSION OF HYDROCARBON OILS

Edwin F. Nelson, Chicago, Ill., assignor to Universal Oil Products Company, Chicago, Ill., a corporation of Delaware Application April 24, 1933, Serial No. 667,659

3 Claims. (Cl. 196—58)

This invention particularly refers to improvements in the type of cracking process and apparatus wherein hot conversion products are introduced from a heating coil into an enlarged vertically disposed reaction chamber wherein the vaporous conversion products are subjected to more prolonged continued conversion time than that afforded the heavier liquid conversion products.

One purpose of the invention is to obtain still shorter conversion time for the heavy liquid conversion products in the reaction chamber than is obtainable by the usual methods now in use while obtaining a continued conversion time for the vaporous products in the reaction zone at least as long as that afforded by ordinary methods.

In one specific form the improved structure of the invention comprises an elongated vertical tube located within the vertical reaction chamber of a cracking system, said tube extending from near the top to near the bottom of the reaction chamber and having a Venturi throat at its upper end. In operation the hot conversion products from the heating coil of the system are introduced into the upper end of said tube and pass downward therethrough, liquid conversion products being withdrawn from the lower portion of the chamber while the vaporous conversion products pass upward around the outside of the tube to the top of the chamber wherefrom vapors are continuously recirculated through the tube by the inductor action of the Venturi throat and wherefrom a portion of the stream of circulating vapors, said portion corresponding to the total production of vaporous conversion products, is continuously withdrawn.

By discharging the total heated conversion products from the heating coil through the tube of restricted cross-section in the reaction chamber their liquid components, as well as the vapors, pass quickly to the lower portion of the chamber wherein substantial separation of the liquid and vaporous conversion products is effected. This, in conjunction with the rapid removal of the liquid from the bottom of the chamber, without allowing any appreciable volume of said material to accumulate and remain within the chamber, followed by cooling of the liquid products so withdrawn, serves to substantially eliminate excessive conversion of the residual liquid, preventing its reduction to coke or heavily carbon-laden or pitch-like material in the reaction chamber. The vaporous conversion products which pass downward through the tube with the liquids flow therefrom at its lower end and pass upward around the outside of the tube to the top of the chamber whereby they are subjected to more prolonged continued conversion time than the residual liquid, the final vaporous conversion products being withdrawn from the upper portion of the chamber. The inductor action of the Venturi throat in the upper portion of the tube into which the stream of heated conversion products is discharged causes the recirculation of vaporous conversion products from the upper portion of the reaction chamber through the tube to the lower portion of the chamber, setting up a local cyclic circulation of vapors within the chamber resulting in a more uniform temperature throughout the reaction chamber than is normally obtained therein. This, in conjunction with the quick separation of the heavy liquid conversion products and their rapid removal from the reaction chamber, permits the use of higher conversion temperatures in the stream of heated conversion products entering the reaction chamber from the heating coil producing results comparable to more continued vapor conversion time in the reaction chamber.

It will be understood that the novel features of the present invention may be utilized to advantage in any type of cracking system employing an enlarged reaction chamber of the general type described and it is therefore not intended to limit the invention to use in any specific type of cracking process or apparatus.

The accompanying diagrammatic drawing, which illustrates one specific type of apparatus in which the features of the present invention are utilized to advantage, is shown for the purpose of more clearly illustrating the nature and operability of the present invention and the following description of the drawing will serve to more clearly illustrate the operation of the process of the present invention as it may be practiced in the apparatus shown.

Raw oil charging stock for the process is supplied through line 1 and valve 2 to pump 3 by means of which it is fed through line 4 and may pass, all or in part, through line 5, valve 6 and line 7 direct to heating coil 8 or may be directed, all or in part, through line 9 and valve 10 into fractionator 11. The raw oil supplied to fractionator 11 may be preheated in this zone by either direct or indirect contact with the vaporous conversion products undergoing fractionation. In the case illustrated, the raw oil from line 9 is introduced into direct contact with the vaporous conversion products in the fractionator, commingling therewith and serving to assist their fractionation and collecting in the lower portion of fractionator 11, together with the reflux condensate formed in this zone. The reflux condensate and preheated raw oil, which forms the combined feed for the process, or the reflux condensate alone, in case no raw oil is supplied to the fractionator, is withdrawn through line 12 and valve 13 to pump 14 by means of which it is fed through line 7 and valve 15 to conversion in heating coil 8, commingling in line 7 with that portion, if any, of the raw oil supplied direct to the heating coil, as already indicated. It will be understood that the raw oil may, when desired, be preheated in any other well known manner, not shown in the drawing, prior to its introduction into the heating coil.

A furnace 16 of any suitable form supplies the required heat to the oil passing through heating coil 8 to bring it to the desired conversion temperature, preferably at a substantial superatmospheric pressure, and the heated oil is discharged through line 17 and valve 18 into reaction chamber 19.

Chamber 19 is also preferably operated at a substantial superatmospheric pressure and, although not illustrated in the drawing, is preferably well insulated to prevent the excessive loss of heat therefrom by radiation so that conversion of the heated oil from the heating coil, and more particularly its vaporous components may continue in this zone. An elongated tube 20 of restricted cross-section, relative to the cross-sectional area of chamber 19, is disposed preferably within the central portion of this zone and extends from near the top to within a short distance from the bottom of the chamber. Due to the restricted cross-section of tube 20 the velocity of the hot conversion products passing downward therethrough from line 17 is greatly increased over that which would result from the introduction of this material into the larger space of the reaction chamber proper. Thus both the liquid and vaporous conversion products pass more rapidly to the bottom of the chamber than would otherwise be the case and the heavy liquid conversion products separate from the vapors and any entrained lighter liquids in the lower portion of the reaction chamber, from which they are quickly removed without allowing any substantial body of such liquid to accumulate, being withdrawn in the case illustrated through line 21 and valve 22 to the reduced pressure vaporizing chamber 23. The vaporous conversion products discharged from the lower end of tube 20 pass upward through the large annular space 24 provided between tube 20 and the walls of chamber 19, being thereby subjected to longer conversion time under the conditions maintained in the reaction chamber than is the residual liquid.

As a feature of the present invention, tube 20 is provided at its upper end with a Venturi throat 25 and the action of the stream of heated conversion products from line 17 passing through the restricted throat induces a recirculation of vapors from the upper portion of the chamber through tube 20 to its lower portion, setting up a continuous, local, cyclic circulation of vapors in chamber 19, causing a thorough mixing of the vapors and resulting in a more uniform vapor temperature throughout the chamber.

A portion of the vaporous conversion products, corresponding with the net production of said materials within the system, is continuously withdrawn from the cyclic stream of vapors through line 26, preferably connected, as here illustrated, with the upper portion of the chamber. The vaporous conversion products pass, in the case illustrated, through valve 27, in line 26, to fractionation in fractionator 11, although they may, when desired, be introduced into chamber 23 at any desired point, either alone or together with the liquid conversion products from the lower portion of the chamber, although well known means for accomplishing this type of operation are not illustrated in the drawing.

By means of valve 22, in line 21, the superatmospheric pressure imposed upon the liquid conversion products in chamber 19 preferably is substantially reduced, resulting in the liberation of latent heat from the liquid conversion products and serving to reduce their temperature sufficiently to prevent any excessive further conversion of this material in line 21 and in chamber 23. When desired, additional well known means of cooling the liquid conversion products, either in line 21 or in the lower portion of the reaction chamber may be employed although, for the sake of simplicity, such means are not shown in the drawing. For example, suitable cooling oil from within the system, such as reflux condensate or residual liquid from chamber 23 or a portion of the raw oil charging stock, or oil from any suitable external source may be commingled, with or without prior cooling, as desired, with the stream of liquid conversion products passing from chamber 19 to chamber 23.

Due to the substantially reduced pressure employed in chamber 23, relative to that employed in the reaction chamber, further vaporization of the liquid conversion products is accomplished in this zone and final separation of vaporous and residual conversion products is effected therein. Residual liquid remaining unvaporized in chamber 23 may be withdrawn therefrom through line 28 and valve 29 to cooling and storage or to any desired further treatment. The vaporous conversion products pass from chamber 23 through line 30, valve 31 and line 26 to fractionation in fractionator 11.

Insufficiently converted components of the vaporous conversion products, boiling above the desired end-boiling point of the final light distillate product of the process, are condensed as reflux condensate in fractionator 11 to be returned, as already described, to heating coil 8 for further conversion.

Fractionated vapors of the desired end-boiling point, preferably comprising materials within the boiling range of gasoline and of good anti-knock value, are withdrawn, together with uncondensable gas produced by the process, from the upper portion of fractionator 11 through line 32 and valve 33 to condenser 34, wherein they are subjected to condensation and cooling. The resulting distillate and gas pass from condenser 34 through line 35 and valve 36 to collection and separation in receiver 37. Uncondensable gas is released from the receiver through line 38 and valve 39. Distillate is withdrawn from this zone through line 40 and valve 41 to storage or to any desired further treatment. A portion of the distillate collecting in receiver 37 may, when desired, be recirculated by well known means, not shown in the drawing, to the upper portion of fractionator 11 for the purpose of assisting fractionation of the vapors and to maintain the desired vapor outlet temperature from the fractionator, thus regulating the end-boiling point of the final light distillate product withdrawn from receiver 37.

Conversion temperatures employed at the outlet from the heating coil may range, for example, from 900 to 1050° F., preferably with a superatmospheric pressure, measured at this point, within the range of 200 to 800 pounds, or more, per square inch. Any desired pressure within this same range, but no greater than that employed at the outlet from the heating coil, may be utilized in the reaction chamber and a substantially reduced pressure ranging from 100 pounds, or thereabouts, per square inch down to substantially atmospheric pressure is preferred in the vaporizing chamber. The pressures employed in the fractionating, condensing and collecting portions of the system may be substantially equalized with or somewhat reduced relative to the pressure employed in the vaporizing chamber.

As a specific example of the operation of the present invention, as it may be practiced in an apparatus such as illustrated and above described, the charging stock is a 46° A. P. I. gravity Pennsylvania distillate which is subjected to a conversion temperature, measured at the outlet from the heating coil, of about 940° F., a superatmospheric pressure of approximately 400 pounds per square inch is employed in the reaction chamber and a substantially equalized vapor temperature of approximately 900° F., is maintained in this zone. The vaporizing chamber is operated at a reduced pressure of approximately 60 pounds per square inch which pressure is substantially equalized in the succeeding portions of the system. The operation may produce, per barrel of charging stock, about 76% of motor fuel having an octane number of approximately 78, about 6% of heavy residual oil and about 500 cubic feet of gas. The residual oil is substantially free of suspended coke or carbonaceous material and no appreciable amount of coke or carbonaceous material is formed in the reaction chamber.

I claim as my invention:

1. In a hydrocarbon oil cracking process of the character wherein the oil is heated to cracking temperature under pressure while flowing in a restricted stream through a heating zone, thence discharged into the upper portion of an externally unheated, vertically elongated reaction zone maintained under cracking conditions of temperature and pressure and wherein conversion takes place by the heat imparted to the oil in the heating zone, and unvaporized oil withdrawn from the lower portion of the reaction zone at a rate adequate to preclude any appreciable accumulation of liquid in the reaction zone during the normal operation of the process; the improvement which comprises passing the hot oil stream discharging from the heating zone into the upper portion of the reaction zone downwardly from the upper to the lower portion of the reaction zone through a tube open at both ends and of restricted cross sectional area relative to that of the reaction zone, separating vapors from unvaporized oil in the lower portion of the reaction zone and rapidly withdrawing the latter as aforesaid, passing separated vapors, to the exclusion of unvaporized oil, upwardly through the reaction zone around said tube whereby these vapors are subjected to the cracking conditions in the reaction zone for a longer time period than the unvaporized oil, and subsequently withdrawing the thus further reacted vapors from the reaction zone.

2. In a hydrocarbon oil cracking process of the character wherein the oil is heated to cracking temperature under pressure while flowing in a restricted stream through a heating zone, thence discharged into the upper portion of an externally unheated, vertically elongated reaction zone maintained under cracking conditions of temperature and pressure and wherein conversion takes place by the heat imparted to the oil in the heating zone, and unvaporized oil withdrawn from the lower portion of the reaction zone at a rate adequate to preclude any appreciable accumulation of liquid in the reaction zone during the normal operation of the process; the improvement which comprises passing the hot oil stream discharging from the heating zone into the upper portion of the reaction zone downwardly from the upper to the lower portion of the reaction zone through an open-ended tube of restricted cross-sectional area relative to that of the reaction zone, separating vapors from unvaporized oil in the lower portion of the reaction zone and rapidly withdrawing the latter as aforesaid, maintaining a local circulation of vapors, to the exclusion of separated unvaporized oil, upwardly from the lower portion of the reaction zone around said tube and thence downwardly through the tube whereby to subject these vapors to the cracking conditions in the reaction zone for a longer time period than the unvaporized oil, and continuously removing vapors from the reaction zone for fractionation and condensation.

3. The improvement as defined in claim 2 further characterized in that said local circulation of vapors is accelerated by discharging said hot oil stream into the upper portion of the tube through a Venturi throat.

EDWIN F. NELSON.